(12) United States Patent
Kageyama et al.

(10) Patent No.: US 12,555,159 B2
(45) Date of Patent: Feb. 17, 2026

(54) INFORMATION PROCESSING METHOD

(71) Applicant: TOYOTA JIDOSHA KABUSHIKI KAISHA, Toyota (JP)

(72) Inventors: Hitoshi Kageyama, Tokyo (JP); Feng Xu, Yokohama (JP); Azusa Watanabe, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/536,508

(22) Filed: Dec. 12, 2023

(65) Prior Publication Data

US 2024/0202813 A1    Jun. 20, 2024

(30) Foreign Application Priority Data

Dec. 16, 2022    (JP) .................................. 2022-200765

(51) Int. Cl.
  *G06Q 30/00*     (2023.01)
  *G06Q 30/0601*   (2023.01)
  *G06Q 30/0645*   (2023.01)

(52) U.S. Cl.
  CPC ..... *G06Q 30/0645* (2013.01); *G06Q 30/0641* (2013.01)

(58) Field of Classification Search
  CPC .................................................. G06Q 30/0645
  See application file for complete search history.

(56) References Cited

U.S. PATENT DOCUMENTS

2013/0166331 A1*   6/2013   Fitzgerald ............. G06Q 10/02
                                                              705/5

FOREIGN PATENT DOCUMENTS

| JP | 2008-242964 A | 10/2008 |
|----|---------------|---------|
| JP | 2011-204177 A | 10/2011 |
| JP | 2011-238131 A | 11/2011 |
| JP | 2022-184159 A | 12/2022 |

OTHER PUBLICATIONS

Kesrarat, Darun, et al. "Smart matching for car rental." Proceedings of the 9th International Conference on Machine Learning and Computing. 2017.*

* cited by examiner

*Primary Examiner* — Kathleen Palavecino
(74) *Attorney, Agent, or Firm* — SoraIP, Inc.

(57) ABSTRACT

A method executed by an information processing apparatus. A designation of a service used by the user is accepted from among a plurality of services for renting a vehicle to the user. Based on the designated service, design data in which a design of a user interface used by the user to search for the vehicle related to the rental is defined is output.

5 Claims, 6 Drawing Sheets

SERVER DEVICE 100
ACCEPTING RESERVATIONS FOR USE OF VEHICLES

USER TERMINAL 200
SEARCH FOR VEHICLES AND APPLY FOR USE

VEHICLE DATA

| VEHICLE ID | MODELING ID | VEHICLE ATTRIBUTES | DEPARTMENT | ... |
|---|---|---|---|---|
| V001 | M001 | ... | ... | ... |
| V002 | M002 | ... | ... | ... |
| V003 | M003 | ... | ... | ... |
| ... | ... | ... | ... | ... |

FIG. 4B

RESERVED DATA

| RESERVATION ID | MEMBERSHIP ID | RESERVATION PERIOD | VEHICLE ID | ... |
|---|---|---|---|---|
| ... | ... | ... | ... | ... |
| ... | ... | ... | ... | ... |
| ... | ... | ... | ... | ... |
| ... | ... | ... | ... | ... |

FIG. 4C

MEMBER DATA

| MEMBERSHIP ID | MEMBERSHIP INFORMATION | ... | ... | ... |
|---|---|---|---|---|
| ... | ... | ... | ... | ... |
| ... | ... | ... | ... | ... |
| ... | ... | ... | ... | ... |
| ... | ... | ... | ... | ... |

INFORMATION PROCESSING METHOD

CROSS-REFERENCE TO RELATED APPLICATION

This application claims priority to Japanese Patent Application No. 2022-200765 filed on Dec. 16, 2022, incorporated herein by reference in its entirety.

BACKGROUND

1. Technical Field

The present disclosure relates to an information processing method.

2. Description of Related Art

Services for making various reservations using a user interface designed by a computer are becoming popular. As a related invention, for example, Japanese Unexamined Patent Application Publication No. 2008-242964 (JP 2008-242964 A) discloses a user interface design method capable of designing a user interface that is easy to change design and excellent in operability.

SUMMARY

An object of the present disclosure is to provide a method capable of easily performing a reservation of a vehicle.

A first aspect of the present disclosure is an information processing method including: a first step of accepting designation of a service used by a user among a plurality of services for renting a vehicle to the user; and a second step of outputting, based on a designated service, design data in which a design of a user interface used by the user to search for a vehicle related to the renting is defined.

Still another aspect of the present disclosure is a program that causes a computer to execute the above-described information processing method, or a computer-readable storage medium storing the program in a non-transitory manner.

According to the present disclosure, it is possible to provide a method of easily reserving a vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Services that temporarily rent vehicles are becoming popular. Such services include car sharing, car leasing, or rental cars. In addition, there are an increasing number of cases where a single provider provides a plurality of services, such as rental cars and car sharing.

The user who receives the rental service of the vehicle makes a reservation of the vehicle in advance using a website or dedicated application software.

Here, a user who makes a reservation of a vehicle needs to specify a plurality of items such as a vehicle type, a use period of the vehicle, or a base where the vehicle is delivered, and search for whether there is a vehicle that meets a desire.

However, depending on the type of service, there is a problem in that it is not always possible to easily search for a vehicle because the items to be emphasized by the user are different.

For example, a user who uses a service that rents a vehicle for a short period of time (about 15 minutes to several hours), such as car sharing, may place more importance on the location of the station where the vehicle is located than on the vehicle type. On the other hand, a user who uses a service that rents a vehicle for a long period of time (in units of months to years), such as car leasing, may place more importance on a specific vehicle model than a location of a station.

Therefore, it is preferable to selectively use the user interface for accepting the vehicle search according to the type of the service. For example, in a short-term rental service, a search function based on a location is mainly provided. In the case of a long-term rental service, a search function based on a vehicle model is mainly provided. The information processing method according to the present disclosure solves such a problem.

An information processing method according to a first aspect of the present disclosure includes: a first step of accepting a designation of a service used by the user from among a plurality of services for renting a vehicle to a user; and a second step of outputting design data in which a design of a user interface used by the user to search for the vehicle related to the rental is defined based on the designated service.

The plurality of services is, for example, a service for renting a vehicle to a user, such as car sharing, rental car, or car leasing. The plurality of services may have different basic contract periods, for example. The basic contract period may be, for example, 15 minutes for car sharing, 12 hours for rental cars, and 1 month for car leasing. In the first step, a service used by the user among the plurality of services is identified. In the second step, data (design data) relating to the design of the user interface used by the user to perform the vehicle search is acquired based on the designated service.

The design data is data defining a design of a user interface for searching for a rentable vehicle. For example, if the user subscribes to rent a vehicle via a website, the design data may be a style sheet. In addition, when the user applies for rental of vehicles via the application program, the design data may be design data of a graphical user interface (GUI) used by the application program.

The design data may be acquired for each service used by the user. For example, when the user desires to use the car sharing service, design data corresponding to the car sharing service is output. When the user desires to use the car lease service, design data corresponding to the car lease service is output.

In this case, the design data corresponding to the car sharing service may be configured to facilitate station search. In addition, the design data corresponding to the car lease service may be configured so as to facilitate vehicle type search.

For example, in a case where the first service in which the rental period of the vehicle is shorter than the predetermined period is designated, design data in which a user interface component that designates a place where the vehicle is delivered is preferentially arranged may be output. In addition, in a case where the second service in which the rental period of the vehicle is longer than the predetermined period is designated, the design data in which the user interface component that designates the vehicle type and the rental period is preferentially arranged may be output.

In addition, a designation of a country or a region that provides a service to a user may be accepted, and design data corresponding to the country or region may be output. Such a configuration can provide a user interface that conforms to the laws and regulations of the country.

Hereinafter, an embodiment of the present disclosure will be described with reference to the drawings. The hardware configuration, the module configuration, the functional configuration, and the like described in the embodiments are not intended to limit the technical scope of the disclosure, unless otherwise specified.

First Embodiment

Figure 1:
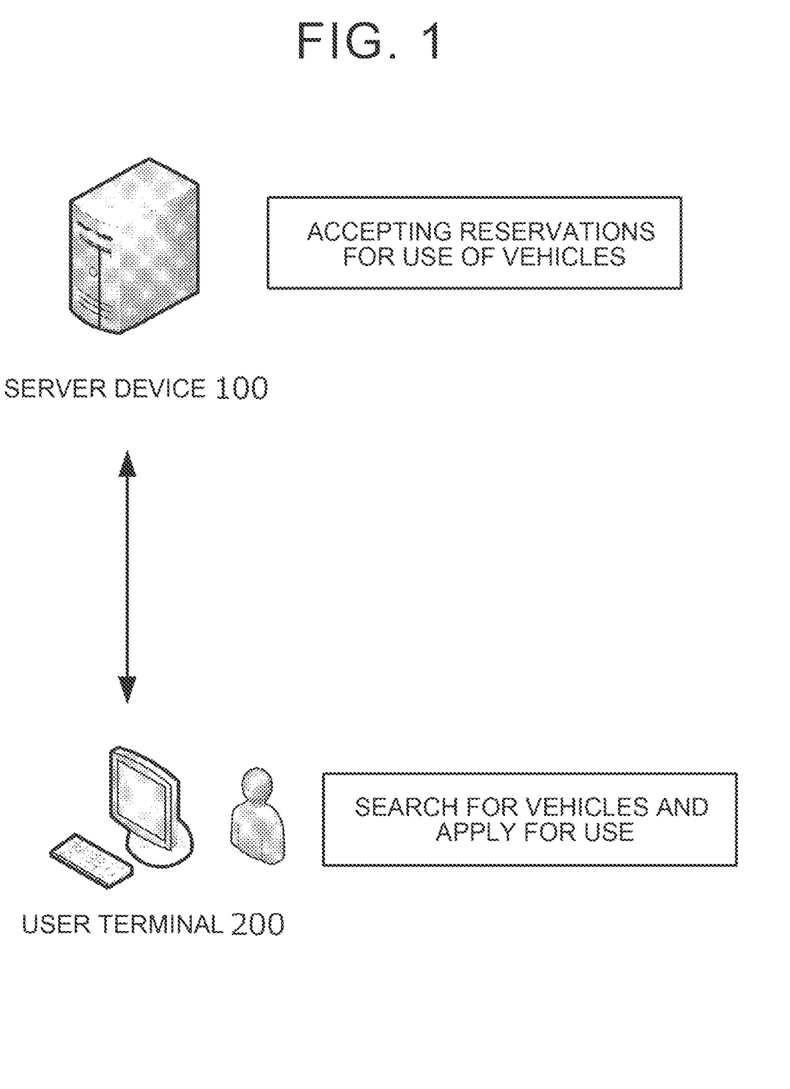
FIG. 1 is a diagram for explaining an outline of a reservation system according to a first embodiment.

An outline of the reservation system according to the first embodiment will be described with reference to FIG. 1. The reservation system according to the present embodiment is a system for reserving a vehicle in a service for temporarily renting the vehicle. The reservation system includes a device (server device 100) for accepting a reservation of a vehicle, and a user terminal 200 for accessing the server device 100.

The server device 100 is a server device operated by a service provider that rents a predetermined vehicle (automobile). Further, the server device 100 stores a reservation ledger of the vehicle, and provides a service for reserving the vehicle desired by the user by interacting with the user terminal 200.

In the present embodiment, the service provider provides a plurality of types of services for renting a vehicle.

Here, a car sharing service and a car leasing service are exemplified as the plurality of types of services. The car sharing service is a service for renting a vehicle in a short time unit, such as a unit of 15 minutes. In addition, the car leasing service is a service for renting a vehicle for a longer period than car sharing, such as in units of one month. A user who is to be rented a vehicle can log in to the server device 100 by specifying any service.

The user terminal 200 is a computer used by a user who is rented a vehicle. The user can access the server device 100 via the user terminal 200 and search for a free vehicle. In addition, it is possible to apply for rental of a desired vehicle.

Figure 2:
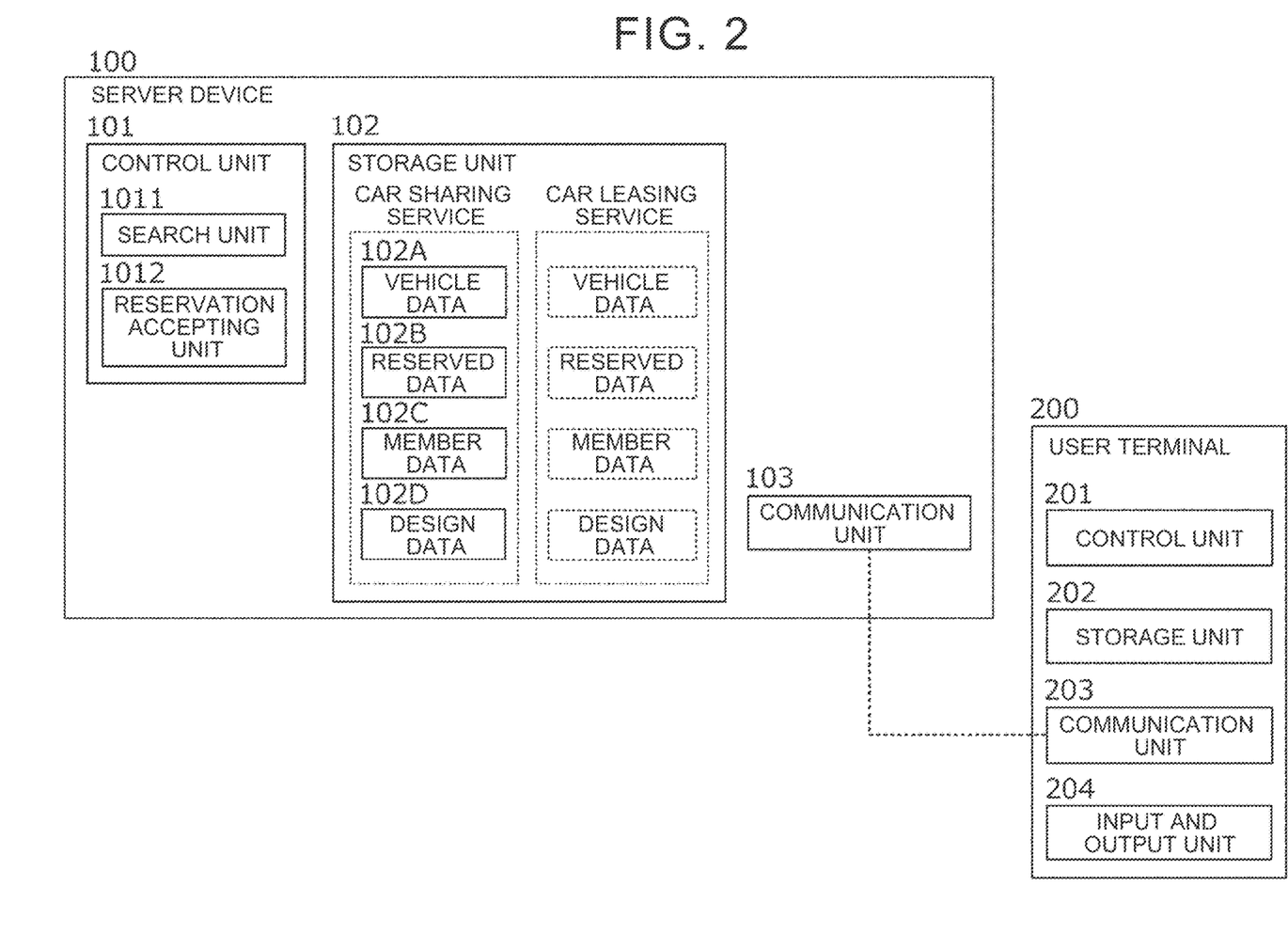
FIG. 2 is a diagram illustrating a configuration of a server apparatus and a user terminal according to the first embodiment.

FIG. 2 is a diagram showing the components of the server device 100 and the user terminal 200 included in the reservation system according to the present embodiment in more detail. First, the user terminal 200 will be described. The user terminal 200 is, for example, a computer used by an individual, such as a personal computer, a smartphone, a mobile phone, a tablet computer, or a personal information terminal. The user terminal 200 includes a control unit 201, a storage unit 202, a communication unit 203, and an input/output unit 204.

The control unit 201 is an arithmetic unit responsible for the control processing performed by the user terminal 200. The control unit 201 is realized by an arithmetic processor such as a Central Processing Unit (CPU).

The control unit 201 accesses the server device 100 and executes a function of performing an interaction. This function may be realized by a web browser operating on the user terminal 200 or by dedicated application software.

The storage unit 202 includes a main storage device and an auxiliary storage device. The main storage device is a memory in which a program executed by the control unit 201 and data used by the control program are expanded. The auxiliary storage device is a device in which a program executed by the control unit 201 and data used by the control program are stored. The auxiliary storage device may store a package of programs executed by the control unit 201 as an application. Also, an operating system for executing these applications may be stored. The program stored in the auxiliary storage device is loaded into the main storage device and executed by the control unit 201, so that the processing described below is performed.

The main storage device may include Random Access Memory (RAM) or Read Only Memory (ROM). The secondary storage device may include Erasable Programmable ROM (EPROM) or Hard Disk Drive (HDD). Further, the auxiliary storage device may include a removable medium, that is, a portable recording medium.

The communication unit 203 is a wireless communication interface for connecting the user terminal 200 to a network. The communication unit 203 is configured to communicate with the server device 100 via a mobile communication service such as a radio LAN, a 3G, 4G, or a 5G, for example. The input/output unit 204 is a unit that receives an input operation performed by a user and presents information to the user. In the present embodiment, a single touch panel display is used. That is, the apparatus includes a liquid crystal display, a control unit thereof, a touch panel, and a control unit thereof.

Next, the server device 100 will be described. The server device 100 accepts a reservation of a vehicle based on a result of an interaction with the user terminal 200, and concludes a rental contract for the vehicle.

The server device 100 can accept a reservation for a plurality of types of vehicle rental services. In the present embodiment, two services are provided: a car sharing service and a car leasing service. The car sharing service in the present embodiment is a service for renting a vehicle in units of 15 minutes. The car leasing service is a service for renting a vehicle in a monthly unit. Each service is rented by a vehicle at a different location (e.g., an unmanned station, a manned sales office). Therefore, the management of the vehicle and the reservation is separately performed for each service.

In the present embodiment, the server device 100 may be configured to execute a Web server for interacting with the user terminal 200. In this case, for example, the user terminal 200 can perform a procedure related to the reservation of vehicles by accessing Web service using a browser. Note that the server device 100 may provide a service by a unit other than Web server. For example, a service that interacts with dedicated application software installed in the user terminal 200 according to a predetermined protocol may be executed in the server device 100.

The server device 100 may be configured as a computer including a processor such as a CPU and a GPU, a main storage device such as a RAM and a ROM, and an auxiliary storage device such as a EPROM, a hard disk drive, and a removable medium. The secondary storage device stores an operating system (OS), various programs, various tables, and the like. The program stored therein is loaded into a work area of the main storage device and executed. The components and the like are controlled through execution of the program. As a result, each function that matches a predetermined purpose, as described later, is realized. However, some or all of the functions may be implemented by a hardware circuit such as an ASIC or an FPGA.

The server device 100 includes a control unit 101, a storage unit 102, and a communication unit 103.

The control unit 101 is an arithmetic unit that controls the control performed by the server device 100. The control unit 101 may be realized by an arithmetic processor such as a CPU. The control unit 101 includes two functional modules: a search unit 1011 and a reservation accepting unit 1012. The functional modules may be implemented by executing stored programs by a CPU.

The search unit 1011 receives a designation of a service used by the user based on a request from the user terminal 200, and searches for a vehicle that can be reserved in the service. Specifically, the search unit 1011 allows the user to select whether to use the car sharing service or the car leasing service, and then searches for a vehicle that the user wishes to rent, and provides the result.

The search unit 1011 generates a graphical user interface (GUI) for searching for a vehicle, acquires a criterion for searching for a vehicle from the user terminal 200 via GUI, and performs a search.

The condition for searching for the vehicle is, for example, a place (a station, a business office, or the like) where the vehicle is delivered, a reservation period, or a vehicle attribute (a vehicle type, a model, or the like).

For example, when the search criterion is a location to pass the vehicles, the search unit 1011 may generate a GUI including the maps. In this case, the user can search the place of the business office or the station from the map.

Further, for example, when the search condition is a reserved period, the search unit may generate a GUI including a component (a date picker, a calendar, or the like) for specifying a date, a time, or the like. In this case, the user can search for a vehicle available for a specified period of time. Further, for example, when the search condition is a vehicle attribute, the search unit may generate a GUI including a component for specifying a vehicle attribute (a type of a vehicle, a body shape, a model, an occupant capacity, or the like). In this case, the user can search for a vehicle having the specified attribute.

In the present embodiment, the search unit 1011 acquires data (hereinafter, referred to as design data) defining the design of GUI, and generates GUI for searching for vehicles based on the design data.

Further, the search unit 1011 acquires and uses different design data based on the service selected by the user.

Figure 3:
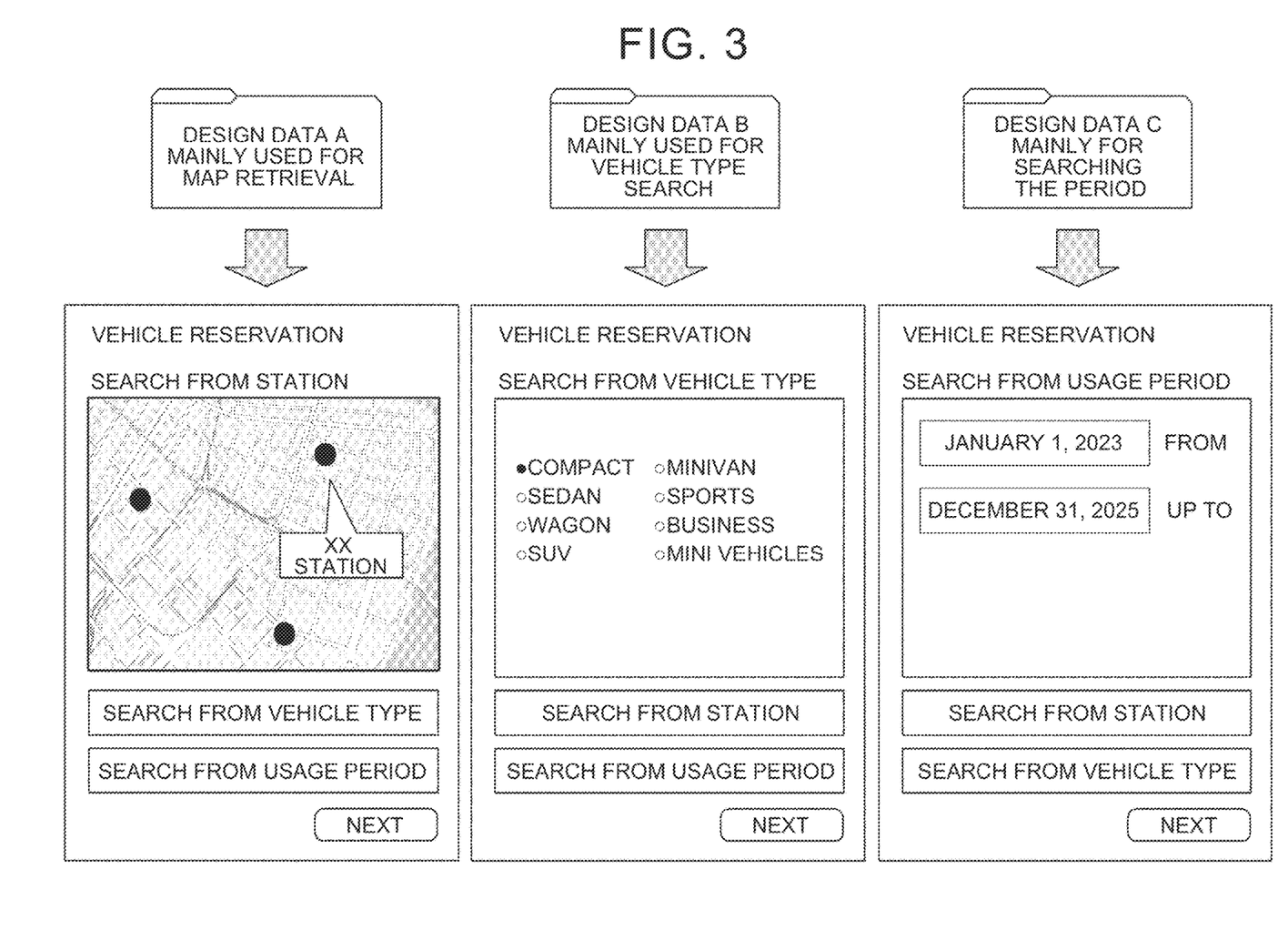
FIG. 3 is an example of a vehicle search screen generated by a server device.

FIG. 3 is a diagram illustrating a plurality of pieces of design data and an exemplary GUI generated by the design data. Here, the design data A is design data for generating a GUI mainly performing station search using maps. The design data B is design data for generating a GUI for mainly searching by vehicle type. The design data C is design data that generates a GUI that is mainly searched for by the usage period.

For example, when a user uses a car sharing service, the user may place more emphasis on the location of the station than can be reserved. In this case, it is preferable that the search unit 1011 generates a search screen using the design data A.

In addition, when the user uses the car leasing service, the user may place more importance on a vehicle type that can be reserved than a place of the business office. In this case, it is preferable that the search unit 1011 generates a search screen using the design data B. Alternatively, the user may emphasize the period of use of the vehicle. In this case, it is preferable that the search unit 1011 generates a search screen using the design data C. As described above, the search unit 1011 stores the association between the service used by the user and the design data used in the vehicle search. The search unit 1011 generates a GUI using the design data corresponding to the selected service. The user can use the generated GUI to search for reservable vehicles.

The reservable vehicle can be searched based on data (for example, data for managing the vehicle, data for managing the reservation, and the like) stored in the storage unit 102 described later. If there is a separate server that manages the reservation, the search unit 1011 may transmit a query to the server.

Note that the designs shown in FIG. 3 differ only in the display method. By the user's operation, a field for inputting other search conditions may be displayed. For example, when a search screen is generated using the design data A, a field for inputting a vehicle type or a usage period is output in a collapsed state. In this case, by tapping the screen, a field for inputting a vehicle type or a usage period may be displayed.

The reservation accepting unit 1012 determines a vehicle to be lent to the user based on the result of the search performed by the search unit 1011. Further, the reservation accepting unit 1012 acquires various conditions necessary for renting the vehicle, and confirms the reservation of the vehicle. The reservation accepting unit 1012 may update the reservation ledger stored in the storage unit 102. When there is a separate server that manages the reservation, the reservation accepting unit 1012 may transmit the reservation data to the server.

The storage unit 102 includes a main storage device and an auxiliary storage device. The main storage device is a memory in which a program executed by the control unit 101 and data used by the control program are expanded. The auxiliary storage device is a device in which a program executed by the control unit 101 and data used by the control program are stored.

In addition, the storage unit 102 stores the vehicle data 102A, the appointment data 102B, the member data 102C, and the design data 102D.

Figure 4A:
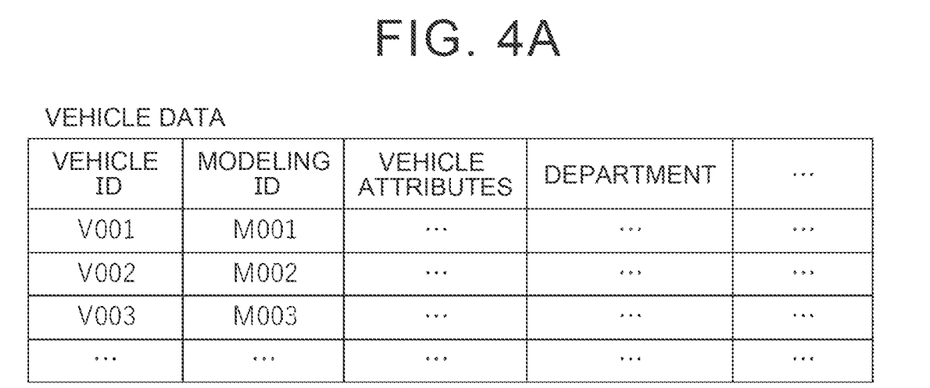
FIG. 4A may be stored in a server-device.

The vehicle data 102A is data related to a plurality of vehicles provided for rental. FIG. 4A is an example of a vehicle-data 102A.

As illustrated, the vehicle data 102A includes vehicle ID, model ID, vehicle attributes, and associated fields.

In the vehicle ID field, an identifier (for example, a cart number or a Vehicle Identification Number (VIN) that uniquely identifies the vehicle is stored. In the model ID field, an identifier for specifying a model or a grade of the vehicle is stored. In the vehicle attribute field, data related to an attribute of the vehicle is stored. The attributes of the vehicle are, for example, a vehicle type, a vehicle cabin type, a capacity, a loading amount, a vehicle body color, an exhaust amount, and the like. In the belonging field, an identifier of a station or a business office where the vehicle is disposed is stored.

The vehicle data may be periodically updated by the server device 100 based on data acquired from an external device that manages information related to the vehicle provided for rental.

Figure 4B:
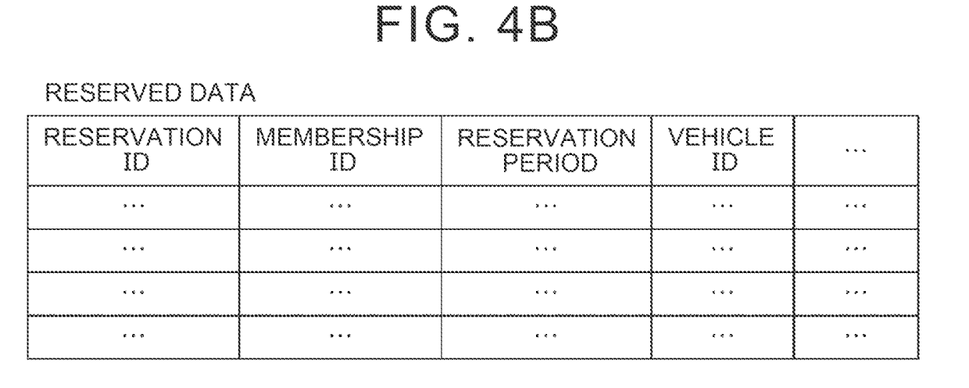
FIG. 4B may be stored in a server-device.

The reservation data 102B is data (reservation ledger) related to reservation of vehicles.

As illustrated in FIG. 4B, in the reservation data 202B, an identifier of a reservation, an identifier of a member, a reservation duration, an identifier of a vehicle, and the like are stored. The reservation data 102B is updated by the reservation accepting unit 1012 at a timing at which the reservation of the vehicle is executed.

Figure 4C:
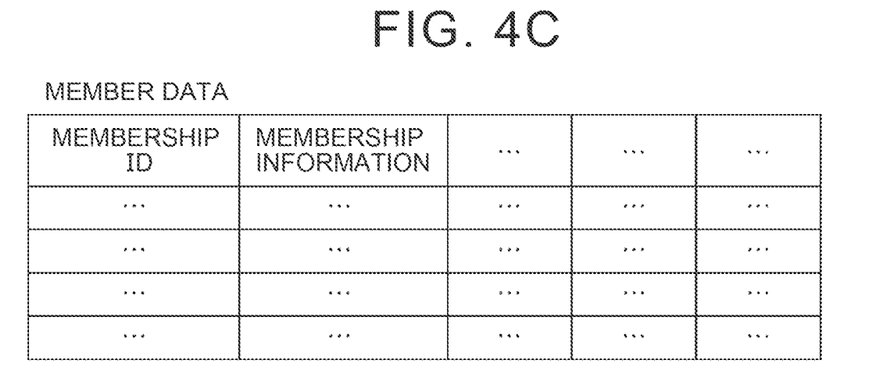
FIG. 4C may be stored in a server-device.

The member data 102C is a set of data related to a member using the service. As shown in FIG. 4C, the member data 202C stores an identifier of the member, member information (personal information of the member), and the like.

The design data 102D is design data of GUI as described above. If the user subscribes to rent the vehicle via the website, the design data may be a style sheet. The search unit 1011 may dynamically generate a search screen using the design data.

The four types of data described above are held for each of the plurality of services.

For example, in a case where the car sharing service and the car leasing service are provided, the vehicle data, the reservation data, the member data, and the design data are separately stored as indicated by the dotted lines in FIG. 2.

The above-described data may be constructed by a program of a database management system (DBMS) executed by a processor managing data stored in a storage device. In this case, each data may be, for example, a relational database.

The communication unit 103 is a communication interface for connecting the server device 100 to a network. The communication unit 103 includes, for example, a network interface board and a wireless communication interface for wireless communication.

The configuration shown in FIG. 2 is an example, and all or a part of the functions shown in FIG. 2 may be executed using a specially designed circuit. In addition, the program may be stored or executed by a combination of the main storage device and the auxiliary storage device other than those illustrated.

Figure 5:
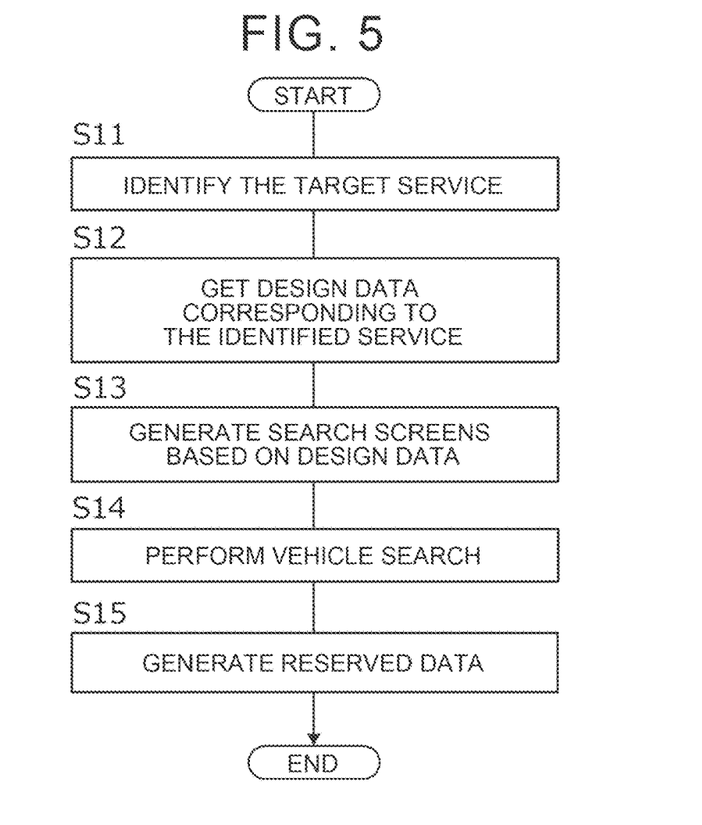
FIG. 5 is a flowchart of processing executed by the server device.

FIG. 5 is a flowchart illustrating a process executed by the server device 100. The processing illustrated in FIG. 5 is started, for example, at a timing when the user logs in to a service provided by the server device 100. It is assumed that the identification of the user is completed in the server device 100 at the timing of starting the processing.

First, in S11, the search unit 1011 identifies a service to be used by the user. The target service may be specified on GUI, or may be identified based on a URL accessed by the user, or the like. For example, when the reservation of the car sharing service and the reservation of the car leasing service are executed on another domain, the service to be used by the user may be identified based on the access destination. Further, in a case where the reservation of the car sharing service and the reservation of the car leasing service are performed by another application program, the service to be used by the user may be identified based on the access source.

In S12, the search unit 1011 extracts design data corresponding to the identified service from the storage unit 102.

In S13, the search unit 1011 generates a GUI for searching for vehicles based on the acquired design data. For example, when the design data is a style sheet, the search unit 1011 applies the style sheet to generate a screen of the website. As a result, a search screen as shown in FIG. 3 is generated.

In S14, the search unit 1011 acquires a search criterion entered by the user via GUI, and performs a vehicular search. For example, when GUI generated by the design data mainly performs the map search, the search unit 1011 acquires information about the vehicles belonging to the stations designated on the map. When GUI provided by the design data is mainly a vehicle type search, the search unit 1011 acquires information about a vehicle matching the designated vehicle type. In addition, when GUI provided by the design data mainly performs the period search, the search unit 1011 acquires information about vehicles that are available in the designated period. These may be extracted based on the vehicular data 102A and the reserved data 102B.

Further, the search unit 1011 may identify a vehicle to be reserved by the user based on the search result. For example, the search unit 1011 may provide the user with the reservation status of the plurality of vehicles included in the search result, and accept the designation of the vehicle desired by the user.

In S15, the reservation accepting unit 1012 acquires various conditions required for reservation of the vehicle, and executes reservation of the vehicle by updating the reservation data 102B.

As described above, the first embodiment provides a screen for searching for a vehicle by using different design data according to the service selected by the user in the system for providing a plurality of services for renting the vehicle to the user.

According to such a configuration, it is possible to preferentially present a search method (for example, a map search, a vehicle type search, a period search, and the like) that the user emphasizes for each service. Usability is improved.

Second Embodiment

In the first embodiment, the server device 100 dynamically generates GUI for performing the vehicle search based on the stored design data.

Figure 6:
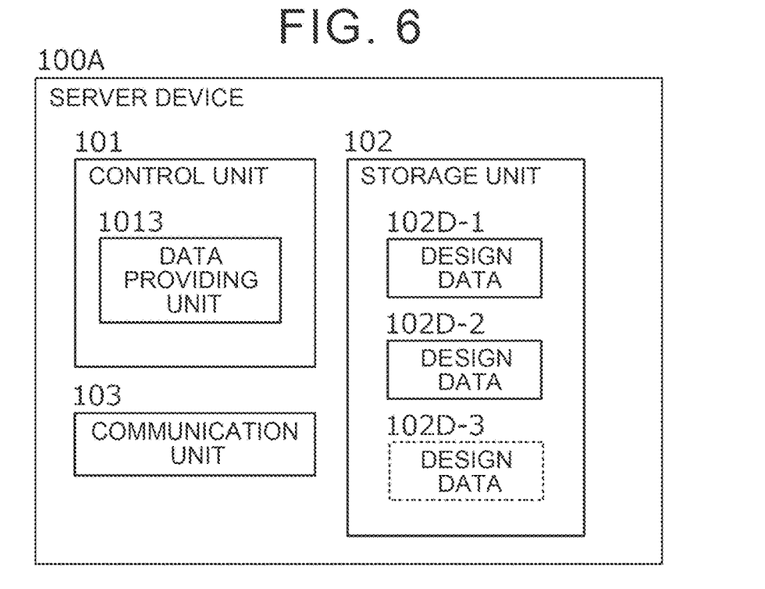
FIG. 6 is a diagram for explaining a configuration of a server device according to a second embodiment.

Meanwhile, the information processing method in the present disclosure may be specified as a method executed by a device that provides a prototype design when designing a GUI. FIG. 6 is a configuration diagram of a server device 100A according to the second embodiment.

The server device 100A according to the second embodiment provides only design data (for example, a design template) in response to an external request. The control unit included in the server-device 100A includes a data providing unit 1013 as a function module.

The data providing unit 1013 receives the designation of the service as an input. In response to this, the data providing unit 1013 extracts design data corresponding to the designated service from the storage unit 102 and outputs the design data.

The storage unit 102 of the server device 100A stores a plurality of design data 102D corresponding to a plurality of services. The storage unit 102 may store data for associating the service with the design data.

In the second embodiment, the external device that designs GUI accepts the selection of the service from the user (designer) and transmits the service identifier to the server device 100A. The server device 100A extracts design data corresponding to the service indicated by the received identifier, and outputs the extracted design data to the external device.

Such a configuration can also provide a GUI for searching for vehicles using service-dependent design data.

In the present embodiment, the server device 100A provides only the design data to the external device, but the server device 100A may apply the extracted design data to generate a GUI and provide the generated GUI to the external device.

Third Embodiment

In the first embodiment, the server device 100 acquires the design data based on the designated service. On the other hand, the design data may be selected on the basis of a region in which the user is located or the like.

Figure 7:
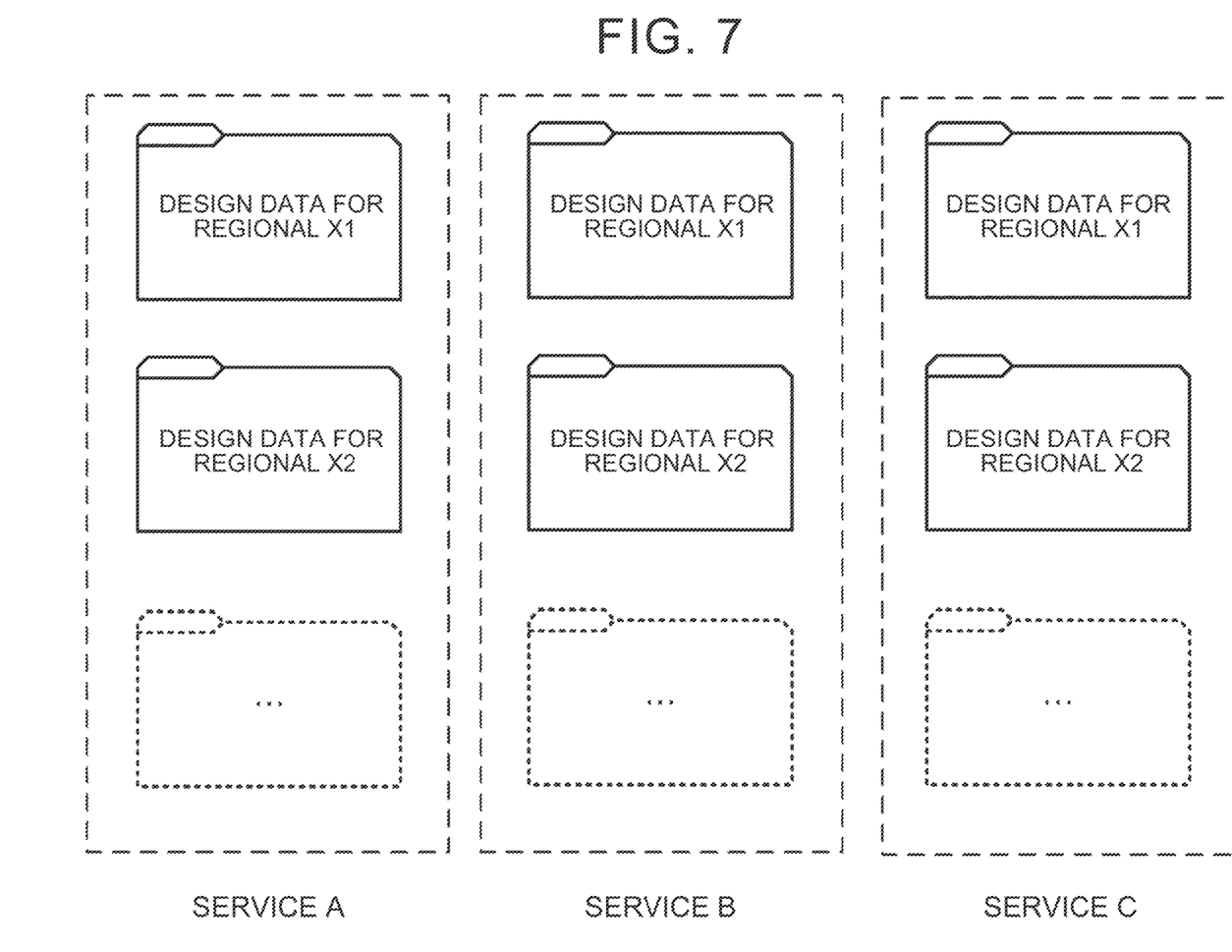
FIG. 7 is an example of design data used in the third embodiment.

FIG. 7 illustrates an example in which design data stored in the storage unit 102 is defined for each region.

For example, when the country or region in which the user (or the user terminal 200) is located can be identified, the server device 100 may select design data corresponding to the designated service and corresponding to the country or region.

In this case, after identifying the service with S11, the search unit 1011 may identify the country or region in which the user is located and extract the corresponding design data from the storage unit 102.

The search unit 1011 may cause the user to input a country or a region in which the user is located. The search unit 1011 may determine the country or region in which the user is located based on the position information transmitted from the user terminal 200.

In the present embodiment, the design data is defined for each service and each region, but the design data defined for each service may be customized for each country or each region.

For example, in a case where the country or region in which the user (or the user terminal 200) is located can be identified, the server device may select design data corresponding to the designated service and then perform customization for the identified country or region. The customization may be, for example, a process of embedding a map. The customization may be a process of adapting the design data to the legislation of the country or region in which the user is located.

MODIFIED EXAMPLES

The above-described embodiment is merely an example, and the present disclosure can be appropriately modified within a range not departing from the gist thereof. For example, the processes and means described in this disclosure may be freely combined and implemented as long as there is no technical inconsistency.

Further, the processes described as being executed by one device may be shared and executed by a plurality of devices. Alternatively, the processes described as being executed by different devices may be executed by one device. In a computer system, it is possible to flexibly change which hardware configuration (server configuration) realizes each function.

The present disclosure can also be realized by supplying a computer program implementing the functions described in the above embodiments to a computer, and reading and executing the program by one or more processors included in the computer. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing method comprising:
   a first step of accepting, via a user terminal, designation of a service used by a user among a plurality of services for renting a vehicle to the user, wherein the plurality of services includes a first service having a rental period shorter than a predetermined period and a second service having a rental period longer than the predetermined period; and
   a second step of outputting, from a server device to the user terminal and based on a designated service, design data in which a design of a graphical user interface used by the user to search for a vehicle related to the renting is defined,
   in response to designation of the first service, the design data includes a user interface component that designates a place where the vehicle is to be delivered and that is preferentially arranged to facilitate location-based searching, and in response to designation of the second service, the design data includes a user interface component that designates a vehicle type of the vehicle and that is preferentially arranged to facilitate vehicle-type-based searching,
   the design data being selected from a plurality of design data stored in the server device, each associated with a corresponding service, and
   the server device applies the selected design data to generate the graphical user interface for display on the user terminal.

2. The information processing method according to claim 1, further comprising a third step of accepting, via the user terminal, designation of a country or a region where the service is provided to the user, wherein in the second step, the design data is selected based on both the designated service and designated country or region, and the selected design data is customized to conform to laws and regulations of the designated country or region.

3. The information processing method according to claim 2, wherein the designation of the country or the region is received via the graphical user interface generated in the second step and displayed on the user terminal.

4. The information processing method according to claim 2, wherein the customization of the design data includes embedding a map corresponding to the designated country or region in the graphical user interface generated in the second step.

5. The information processing method according to claim 2, wherein the customization of the design data includes adapting the design data to a legislation of the designated country or region.

* * * * *